(12) United States Patent
Edström

(10) Patent No.: US 6,508,353 B1
(45) Date of Patent: Jan. 21, 2003

(54) CONVEYOR AND PLANT FOR BALING PAPER PULP

(75) Inventor: Tomas Edström, Ankarsvik (SE)

(73) Assignee: Valmet Fibertech AB (SE)

( * ) Notice: Subject to any disclaimer, the term of this patent is extended or adjusted under 35 U.S.C. 154(b) by 0 days.

(21) Appl. No.: 09/623,935

(22) PCT Filed: Mar. 11, 1999

(86) PCT No.: PCT/SE99/00377
§ 371 (c)(1),
(2), (4) Date: Sep. 12, 2000

(87) PCT Pub. No.: WO99/46192
PCT Pub. Date: Sep. 16, 1999

(30) Foreign Application Priority Data

Mar. 12, 1998 (SE) .............................................. 9800807

(51) Int. Cl.$^7$ ............................................... B65G 43/00
(52) U.S. Cl. ................... 198/502.3; 198/502.4
(58) Field of Search ........................... 198/502.1, 502.3, 198/502.4

(56) References Cited

U.S. PATENT DOCUMENTS 5,230,418 A * 7/1993 Agnoff ..................... 198/502.4
5,295,571 A * 3/1994 Van Der Bogaert et al. ..... 198/502.3 X

FOREIGN PATENT DOCUMENTS

| CH | 520 049 C | | 4/1972 | |
|---|---|---|---|---|
| DE | 29 18 149 A1 | | 11/1980 | |
| DE | 35 13 753 A1 | | 10/1986 | |
| DE | 44 47 293 A1 | | 5/1996 | |
| EP | 0 564 430 A1 | | 10/1993 | |
| GB | 2020615 | * | 11/1979 | .............. 198/502.3 |
| JP | 56-145007 | * | 11/1981 | .............. 198/502.3 |
| JP | 62-249812 | * | 10/1987 | .............. 198/502.3 |
| JP | 63-143110 | * | 6/1988 | .............. 198/502.3 |
| JP | 63-315414 | * | 12/1988 | .............. 198/502.3 |

* cited by examiner

Primary Examiner—James R. Bidwell
(74) Attorney, Agent, or Firm—Lerner, David, Littenberg, Krumholz & Mentlik, LLP

(57) ABSTRACT

Conveyor systems are disclosed including a chain conveyor for carrying a predetermined load, a frame for the chain conveyor, a track, wheels for supporting the frame for movement along the track from a predetermined reference position, the chain conveyor being movably supported on the frame for movement from the predetermined reference position, and sensors for detecting the position of the conveyor along the track with respect to the first predetermined reference position without direct contact, or for detecting the position of the chain conveyor with respect to the second predetermined reference position without direct contact, the sensors delivering a train of pulses corresponding to a predetermined distance of movement of the conveyor along the track or of movement of the chain conveyor with respect to the frame, whereby the position of the conveyor along the track or of the chain carrier can be determined.

23 Claims, 2 Drawing Sheets

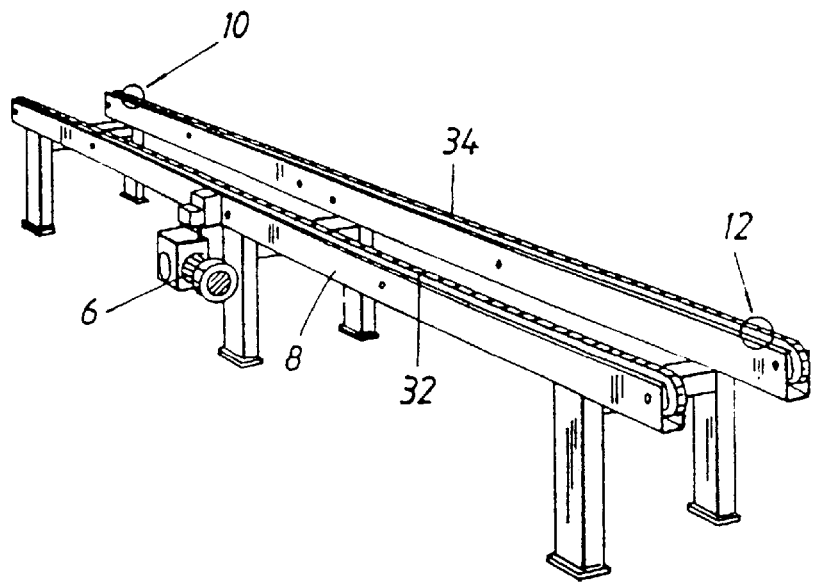
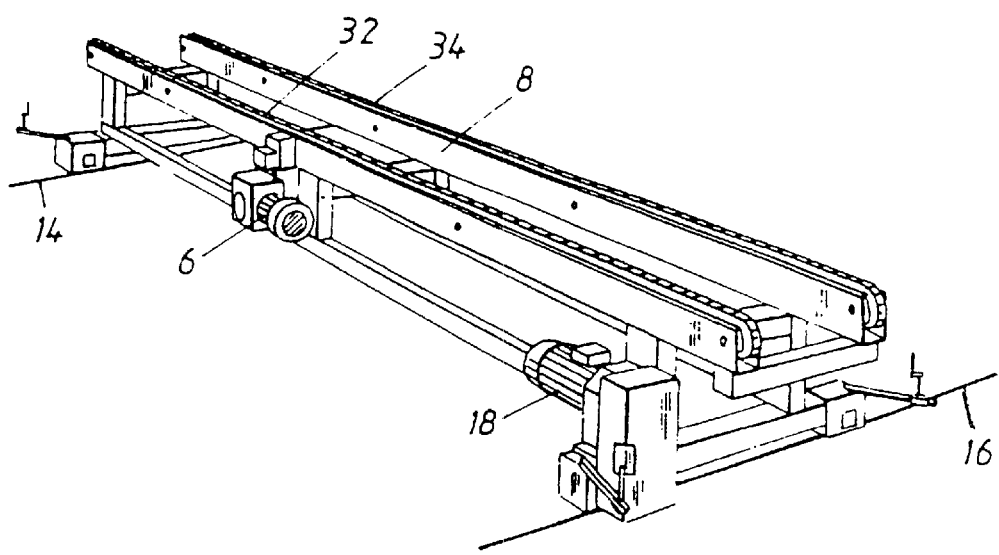

CONVEYOR AND PLANT FOR BALING PAPER PULP

FIELD OF THE INVENTION

The present invention relates to a conveyor with a frame supporting a carrier device for carrying a load. More particularly, the present invention relates to such a conveyor supported by motor-driven wheels to effect traveling movement along a predetermined track and/or the carrier device being movably supported in relation to the frame of the conveyor. Still more particularly, the present invention also relates to a plant for baling paper pulp.

BACKGROUND OF THE INVENTION

It is well know in the art that driving motors for the movement of conveyors, as well as driving motors for carrier devices on the conveyor frame, can be stopped in different stop positions by the action of mechanically mounted limit positions. The limit positions communicate with contactors, for example, which activate the driving motors. When the contactors are in "on" position the driving motors run at full speed and are stopped when the contactors, under the influence of the limit positions, are caused to assume the "off" position. However, movement of the conveyor and/or of the carrier device is stopped with a certain time delay, which means that precision in stopping in the path of travel of the conveyor or of the carrier device on the conveyor is generally poor. Stopping thus sometimes occurs "too early" in the actual movement, and sometimes "too late." The location of the limit position in the path of travel of the conveyor and/or the limit positions of the carrier device must then be mechanically adjusted so that stopping occurs at the intended location. Adjusting the limit positions in this manner is impractical and time-consuming.

It is often desirable for the conveyor to be stopped at several points along its path of travel and/or for the carrier device to be stopped at several points in relation to the conveyor frame. It is known in the art that this can be realized by permitting the traveling movement of the conveyor, or carrier device movement, to continue for a specified time and then be stopped, which is hardly an exact method. Alternatively, several stop locations can be determined by means of limit positions arranged at these stop locations. The problems which are encountered with such an arrangement are particularly difficult in the case of the actual traveling movement of the conveyor. Limit position indicators must therefore be used to provide a number of "preparatory" limit positions before a stop position, in order to indicate that the speed must be reduced, and the driving motor must be stopped at some way considerably before the actual stop position, since the conveyor will continue its movement due to inertia. The load on the conveyor is also of significance in this regard. The conveyor must often thus be pulled to the actual stop position with the aid of hydraulic devices after the driving motor has been stopped. Another drawback is that the situation is different when the conveyor is traveling in the opposite direction. The result is that a very large number of limit positions is required. For five stop positions, for instance, thirteen limit positions are required, including preparatory limit positions.

Present technology renders it difficult to set correct stop positions for the conveyor movements since these are dependent on the performance of the driving motor, the cycle time of the control program, the friction on the rails and the total weight of the conveyor, which is also dependent on the size of the load.

Considerable precision in the movement of the conveyor is thus required for many applications, e.g. baling paper pulp. Several bales must often be placed on the carrier device one at a time. It is then of great importance that the distribution of or the spacing between the bales is always substantially the same. The bales must also be well centered on the conveyor during transfer from one conveyor to the next. The greater the precision in this respect, which is thus determined by the carrier device being stopped at the correct positions, the simpler will be subsequent handling with machines, trucks and the like.

One object of the present invention is to thus eliminate the above-discussed drawbacks in known conveyors.

SUMMARY OF THE INVENTION

In accordance with the present invention, this and other objects have now been realized by the invention of a conveyor system comprising a conveyor including carrier means for carrying a predetermined load, a frame for the carrier means, a track, wheel members supporting the frame for movement along the track from a predetermined reference position, and sensor means for detecting a position of the conveyor along the track with respect to the predetermined reference position without direct contact therewith, the sensor means delivering a train of pulses corresponding to a predetermined distance of movement of the conveyor along the track, whereby the position of the conveyor along the track can be determined. In a preferred embodiment, the conveyor system includes a driving motor for moving the conveyor along the track, and the sensor means are positioned to detect the rotation of the wheel members along the track or the rotation of the driving motor.

In accordance with one embodiment of the conveyor system of the present invention, the conveyor system includes a plurality of detection points disposed along the track for detection by the sensor means. Preferably, the plurality of detection points comprise a plurality of openings evenly spaced along the track.

In accordance with another embodiment of the conveyor system of the present invention, the conveyor system includes speed control means for controlling the speed of movement of the conveyor along the track based upon the train of pulses determined by the sensor means.

In accordance with another embodiment of the conveyor system of the present invention, the carrier means comprises a chain conveyor.

In accordance with another embodiment of the conveyor system of the present invention, the driving motor comprises a reversible driving motor, whereby the direction of movement of the conveyor along the track can be reversed.

In accordance with another embodiment of the conveyor system of the present invention, the sensor means comprises conductive pulse transducer means for detecting conductive changes and determining the corresponding train of pulses based thereon.

In accordance with another embodiment of the conveyor system of the present invention, the conveyor system is used in the baling of paper pulp.

In accordance with the present invention, a conveyor system has been discovered which comprises a conveyor including carrier means for carrying a predetermined load, a frame for the carrier means, the carrier means being movably supported on the frame for movement from a predetermined reference position, and sensor means for detecting the position of the conveyor means with respect to the predetermined reference position without direct contact therewith, the sensor means delivering a train of pulses corresponding to a predetermined distance of movement of the carrier means with respect to the frame, whereby the position of the carrier means can be determined. In a preferred embodiment, the conveyor system includes a plurality of motor driven gear wheels for movably supporting the carrier means with respect to the frame. Preferably, the conveyor system includes a driving motor for driving the motor driven gear wheels, and the sensor means are positioned to detect the rotation of the motor driven gear wheels or the rotation of the motor.

In accordance with one embodiment of the conveyor system of the present invention, the conveyor system includes a plurality of detection points disposed along the carrier means for detection by the sensor means. Preferably, the plurality of detection points comprises a plurality of openings evenly spaced along the carrier means.

In accordance with another embodiment of the conveyor system of the present invention, the conveyor system includes speed control means for controlling the speed of movement of the carrier means along the frame based upon the train of pulses determined by the sensor means.

In accordance with another embodiment of the conveyor system of the present invention, the driving motor comprises a reversible driving motor whereby the direction of movement of the carrier means with respect to the frame can be reversed.

In accordance with another embodiment of the conveyor system of the present invention, the conveyor system includes a plurality of end position indicators for stopping movement of the carrier means along the frame at predetermined end positions.

In accordance with another embodiment of the conveyor system of the present invention, the sensor means comprise inductive pulse transducer means for detecting inductive changes and determining the corresponding train of pulses based thereon.

In accordance with another embodiment of the conveyor system of the present invention, the conveyor system is used in the baling of paper pulp.

In accordance with the conveyor system of the present invention, traveling movement is determined from a zero or reference position and sensors are arranged for contactless detection of the position of the conveyor on the track by counting pulses, one pulse corresponding to a certain distance. The direction of movement of the driving motor is also known.

In accordance with a preferred embodiment of the present invention, the position of the conveyor can be detected by measuring the rotation of the driving motor or the wheels. The position can also be measured with the aid of points along the track of the conveyor, in the form of openings spaced evenly along a strip, which the sensor thus detects. Alternatively, the strip may be provided with light and dark lines or bands which are detected one after another by a sensor on the conveyor or carrier device in order to sense movement in this manner. The above-mentioned technology, with fixed points, lines or the like along the path of movement provides a reliable way of determining the position of the conveyor since the actual position is detected, as opposed to the case where the position is determined from the rotation of the driving motor or wheels. If the wheels were to slip in the latter case, for instance, determination of the position would be incorrect.

In accordance with the present invention, the position of the carrier device can be detected by measuring the rotation of the driving motor or of the gear wheels. Only one limit position is thus required at each end of the carrier device in order to obtain starting points to determine the relative position of the carrier device after the load has influenced the limit position.

The conveyor system in accordance with the present invention offers not only functional improvements but also advantages from the points of view of both manufacturing and installation. With the conveyor system in accordance with the present invention the stop positions are thus determined by means of software instead of physically, as with previously known technology. This means that all conveyors can be made the same, thereby facilitating standardization, thus improving manufacture. Installation and start-up of the conveyor movements can now be performed more quickly, since no physical stop positions need be moved and adjusted, and the load on the conveyor carrier device can be taken into consideration when controlling the movements of the conveyor.

The pulse transducer technology in accordance with the present invention is also well suited for use in connection with so-called frequency operation of the driving motors. During such frequency operation the speed of the driving motor is controlled by means of pulses which have varying on and off times. The motor speed can thus be optionally controlled from standstill up to full speed, and smooth starting and stopping movements can be achieved so the load is not displaced. Higher speeds can be used for movements of the conveyor, and the speed can be gradually reduced so that the desired stop position is reached exactly. The capacity of the plant is also increased in relation to known technology if conveyors comprising pulse transducer technology are used in a baling line, for instance.

According to an advantageous embodiment of the conveyor system in accordance with the present invention, the sensors comprise inductive pulse transducers which are arranged to detect inductive changes when the wheels or driving motors are rotating. These pulse transducers are extremely reliable and are particularly well suited for industrial applications, and since detection occurs contactless, there is no wear or abrasion. The pulse transducers are accurate and are protected from vibrations, dampness and dirt, and can therefore be advantageously used in difficult environments.

The invention present also relates to a plant for baling paper pulp.

BRIEF DESCRIPTION OF THE DRAWINGS

To further explain the present invention, reference is made to the following detailed description, which, in turn, refers to the accompanying drawings, in which FIG. 1 is a side, perspective view of a conveyor system in accordance with the present invention;

FIG. 2 is a side, perspective view of another conveyor system in accordance with the present invention;

DETAILED DESCRIPTION

Figure 3:
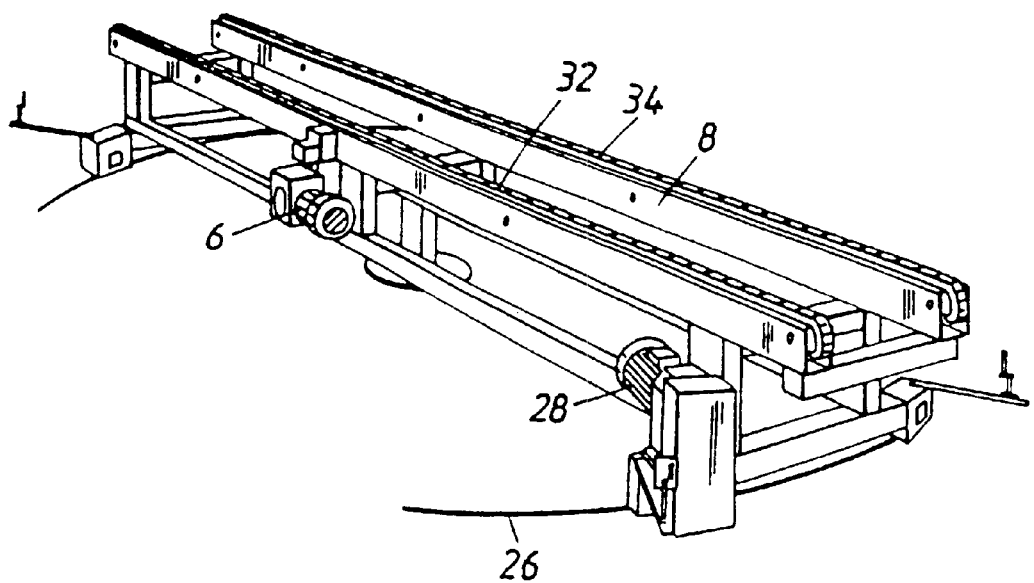
FIG. 3 is a side, perspective view of yet another conveyor system in accordance with the present invention.

Referring to the Figures, in which like reference numerals refer to like elements thereof, the embodiments of the conveyor system in accordance with the present invention shown in FIGS. 1–3 are primarily intended for use in a plant for baling paper pulp.

FIG. 1 shows a stationary chain conveyor with a carrier device in the form of two conveyor chains, 32 and 34. The chains, 32 and 34, are supported by gear wheels attached to the conveyor frame 8 and driven by a driving motor 6. Spring limit position indicators, 10 and 12, are arranged at the ends of the conveyor. When a load is passed onto one end of the conveyor it affects the limit position at this end and this is then used as zero or reference position.

Figure 4:
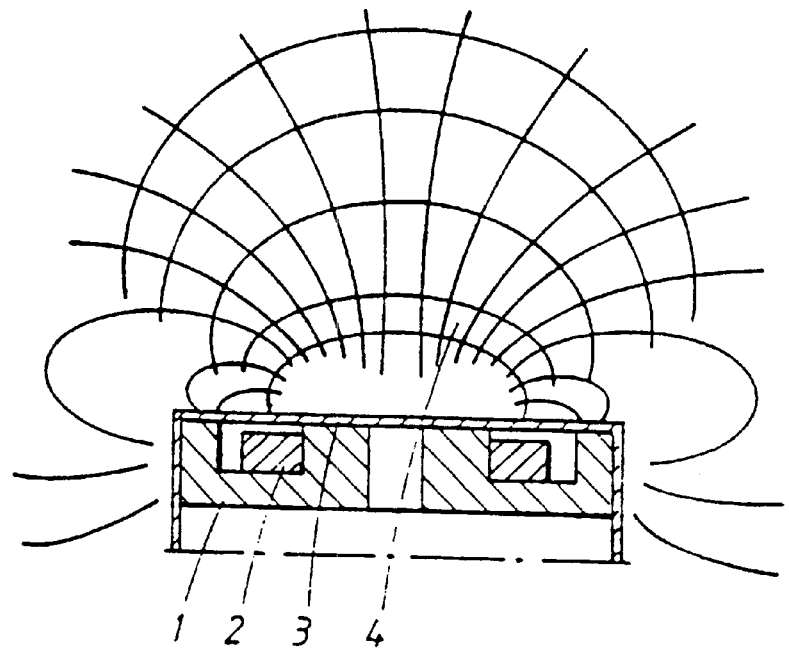
FIG. 4 is a front, sectional view demonstrating use of the sensors in connection with the conveyor system in accordance with the present invention.

Sensors, preferably inductive pulse transducers of a type shown in FIG. 4, are arranged to detect the rotation of the gear wheels for establishing the rotation of the conveyor chains, 32 and 34, in relation to the zero or reference position. The zero or reference position on the conveyor in question, where the load at present is on the chain, is used as the point of departure and emitted from this zero or reference position the number of pulses is then counted in order to obtain the actual position.

The limit position where the load leaves the conveyor is used as a safety device so that the load does not fall off the conveyor.

The driving motor 6 for the conveyor chains, 32 and 34, is connected, by means of gear wheels and separate drive chains (not shown in the figure), to a shaft common to both chains, 32 and 34, so that they are always driven at the same speed. A separate tensioning device is preferably arranged for each chain to ensure correct individual tension in each chain.

FIG. 2 shows a traveling conveyor, carried on wheels enabling it to perform traveling movement along a predetermined track. The track may suitably be formed by rails, 14 and 16. A drive motor 18 is arranged to drive at least one of the wheels supporting this traveling conveyor in order to propel it along its track, 14 and 16.

Sensors of the type shown in FIG. 4 are preferably arranged inside the gearbox of the driving motor 18, so that the position of the conveyor on the track, starting from a zero or reference position, can easily be determined by counting the pulses from the sensor. The sensors may, however, be arranged in any movable part of the motor.

The direction of travel of the conveyor and/or the direction of movement of the carrier device in relation to the conveyor frame can be determined through knowledge of the direction of rotation of the driving motor, or alternatively, by two phase-shifted pulse trains.

The traveling conveyor shown in FIG. 2 is in all other respects also a chain conveyor of a type similar to that shown in FIG. 1.

FIG. 3 shows another example of a conveyor in accordance with the present invention. This conveyor is of the turning or swiveling type, i.e. similar to the traveling conveyor in FIG. 2 except that the track is circular and the movement therefore comprises a turning or swiveling movement. In the same way as in FIG. 2 the conveyor is supported by wheels on a rail 26 which, in this case, is curved in a circle. The driving motors 6 and 28 are normally asynchronous electric motors, connected to the wheels by means of toothed transmission gears, an inductive pulse indicator being arranged on the driving motor shaft.

All driving motors in the conveyors described above are reversible for switching the direction of movement for both the traveling movement and the movement of the chains.

The examples of conveyors shown in FIGS. 1–3 can be modified and varied in many ways. Thus, the width of the conveyor and the number of chains may be increased, for instance, and the length of the conveyor may be varied. This offers great flexibility in constructing various conveyor systems.

In order to detect the rotation of the driving motors, 6 and 18, sensors are used, such as those of the type described in the brochure "ifm, inductive proximity switches," ifm Catalogue 1997/1998, which emit pulse trains depending on the rotation of the motor. FIG. 4 shows the principal structure of such a sensor in the form of an inductive pulse indicator comprising a ferrite core 1 with an inductive coil 2. The core 1 and the coil 2 are enclosed in a casing 3, and the electromagnetic field around the sensor is illustrated at 4.

The coil 2 and ferrite core 1 form the inductive part of a tuned LC circuit that drives an oscillator. The coil 2 and core 1 generate a low-energy electromagnetic field 4 on the sensor side of the pulse transducer. When an electric conductor, such as a metal object, enters this field, eddy currents are generated in the conductor. These eddy currents draw energy from the field 4, and when the eddy currents become so large that amplifiers pertaining to the pulse transducer are unable deliver sufficient energy, the oscillator stops, and the field collapses. In this way "no object in the active zone of the sensor" or "the presence of an object in the active zone" can be detected in the form of oscillations with large amplitude or oscillations with small amplitude, and corresponding pulse trains are delivered.

Thus, movement of a metal part, e.g. a tooth on a rotating gear wheel, can be detected as it moves through the active zone of the sensor. Since the detection is contactless, no mechanical wear occurs and the sensor can be protected from dampness and dirt inside a casing. Switching between high amplitude and low amplitude may be effected with high frequency and detection is therefore accurate.

Other types of sensors can also be used in the conveyor in accordance with the present invention, e.g. sensors in the form of capacitive pulse transducers, as well as sensors comprising Hall elements, in order to detect rotation of the wheel or driving motor in question, and deliver a corresponding pulse train. The sensor may also be of the optical type, i.e., it may comprise a light source which emits a light ray towards a receiver, the light source and the receiver being arranged so that the light ray is interrupted a predetermined number of times per revolution of the wheel or driving motor in question, e.g. as a result of the passage of teeth in a rotating gear wheel. A corresponding output pulse train is then obtained from the receiver. Other types of optical sensors, emitting light and detecting reflected light from dark and light bands, oriented perpendicular to the track of movement, e.g. on a strip along the track, can be used. The sensors may also be in the form of incremental transducers arranged to be stepped forward by the pulses a predetermined number of steps per revolution of the wheel or driving motor in question. These transducers are often designed with inductive or optical ensors.

In the embodiments described above, by way of example, the pulse transducers are arranged in the drive motor or at gear wheels on the output shaft of the driving motor. The pulse transducers may also be arranged to detect rotation of the gear wheels over which the load chains, 32 and 34, run, and rotation of the wheels supporting the conveyors, respectively, in the embodiments shown in FIGS. 2 and 3. In principle the sensors can be arranged on any moving part in the motor.

Members are preferably provided to control the speed of traveling movement of the conveyor and/or the speed of the carrier device. This is possible since, because of the sensor, the location of the conveyor and the carrier device, respectively, is known. The speed can thus gradually be reduced so that "gentle" stop is achieved in exactly the desired position, preferably with the aid of so-called frequency operation. as described above.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A conveyor system for use in baling paper pulp, comprising at least one conveyor including carrier means for carrying at least one load, a frame for said carrier means, a track, wheel members supporting said conveyor for movement along said track from a predetermined reference position, a driving motor for moving said conveyor along said track and sensor means for detecting a position of said conveyor along said track with respect to said predetermined reference position without direct contact therewith, said sensor means delivering a train of pulses corresponding to a predetermined distance of movement of said conveyor along said track, whereby the position of said conveyor along said track can be determined; wherein said sensor means are positioned to detect the rotation of said wheel members along said tracks or the rotation of said driving motor.

2. The conveyor system of claim 1 wherein first sensor means comprise inductive pulse transducers for detecting inductive changes and determining said corresponding train of pulses based thereon and said second sensor means comprises inductive pulse transducers for detecting inductive changes and determining said corresponding train of pulses based thereon.

3. The conveyor system of claim 1 including a plurality of detection points disposed along said track for detection by said sensor means.

4. The conveyor system of claim 3 wherein said plurality of detection points comprise a plurality of openings evenly spaced along said track.

5. The conveyor system of claim 1 including speed control means for controlling the speed of movement of said conveyor along said track based upon said train of pulses determined by said sensor means.

6. The conveyor system of claim 1 wherein said carrier means comprises a chain conveyor.

7. The conveyor system of claim 1 wherein said driving motor comprises a reversible driving motor, whereby the direction of movement of said conveyor along said track can be reversed.

8. A conveyor system for use in baling paper pulp, comprising at least one conveyor including carrier means for carrying at least one load, a frame for said carrier means, a track, wheel members supporting said frame for movement along said track from a predetermined reference position, and sensor means for detecting a position of said conveyor along said track with respect to said predetermined reference position without direct contact therewith, said sensor means delivering a train of pulses corresponding to a predetermined distance of movement of said conveyor along said track, whereby the position of said conveyor along said track can be determined; wherein said sensor means comprises inductive pulse transducer means for detecting inductive changes and determining said corresponding train of pulses based thereon.

9. A conveyor system for use in baling paper pulp comprising at least one conveyor including carrier means for carrying at least one load, a frame for said carrier means, said carrier means being movably supported on said frame for movement from a predetermined reference position, a plurality of motor driven gear wheels for movably supporting said carrier means with respect to said frame and sensor means for detecting the position of said carrier means with respect to said predetermined reference position without direct contact therewith, said sensor means delivering a train of pulses corresponding to a predetermined distance of movement of said carrier means with respect to said frame, whereby the position of said carrier means can be determined.

10. The conveyor system of claim 1 including a driving motor for driving said motor driven gear wheels, and wherein said sensor means are positioned to detect the rotation of said motor driven gear wheels or the rotation of said motor.

11. The conveyor system of claim 9 including a plurality of detection points disposed along said carrier means for detection by said sensor means.

12. The conveyor system of claim 11 wherein said plurality of detection points comprises a plurality of openings evenly spaced along said carrier means.

13. The conveyor system of claim 9 including speed control means for controlling the speed of movement of said carrier means along said frame based upon said train of pulses determined by said sensor means.

14. The conveyor system of claim 10 wherein said driving motor comprises a reversible driving motor whereby the direction of movement of said carrier means with respect to said frame can be reversed.

15. The conveyor system of claim 9 including a plurality of end position indicators for stopping movement of said carrier means along said frame at predetermined end positions.

16. The conveyor system of claim 9 wherein said sensor means comprise inductive pulse transducer means for detecting inductive changes and determining said corresponding train of pulses based thereon.

17. A conveyor system for baling paper pulp, comprising at least one conveyor including a carrier device for carrying at least one load, a frame for said carrier device, said carrier device being movably supported on said frame for movement from a first predetermined reference position, a track, wheel members supporting said conveyor for movement along said track from a second predetermined reference position, first sensor means for detecting a position of said carrier device along said frame with respect to said first predetermined reference position without direct contact therewith, and second sensor means for detecting a position of said conveyor along said track with respect to said second predetermined reference position without direct contact therewith, said first sensor means delivering a train of pulses, each pulse corresponding to a certain distance of movement of said carrier device along said frame and said second sensor means delivering a train of pulses, each pulse corresponding to a certain distance of movement of said conveyor along said track, whereby the position of said carrier device along said frame and the position of said conveyor along said track can be determined.

18. The conveyor system of claim 17 including a plurality of motor driven gear wheels for movably supporting said carrier device with respect to said frame, a first driving motor for driving said motor driven gear wheels, and a second driving motor for moving said conveyor along said track, wherein said first sensor means are positioned to detect the rotation of said motor driven gear wheels or the rotation of said first motor and said second sensor means are positioned to detect the rotation of said wheel members along said track or the rotation of said second driving motor.

19. The conveyor system of claim 17 including a first plurality of detection points disposed along said carrier device for detection by said first sensor means and a second plurality of detection points disposed along said track for detection by said second sensor means.

20. The conveyor system of claim 19 wherein said first plurality of detection points comprises a plurality of openings evenly spaced along said carrier device and said second plurality of detection points comprises a plurality of openings evenly spaced along said track.

21. The conveyor system of claim 17 including a first speed controller for controlling the speed of movement of said carrier device along said frame based upon said train of pulses determined by said first sensor means and a second speed controller for controlling the speed of movement of said conveyor along said track based upon said train of pulses determined by said second sensor means.

22. The conveyor system of claim 17 wherein said carrier device comprises a chain conveyor.

23. The conveyor system of claim 18 wherein said first driving motor comprises a reversible driving motor, whereby the direction of movement of said carrier device with respect to said frame can be reversed, and said second driving motor comprises a reversible driving motor, whereby the direction of movement of said conveyor along said track can be reversed.

* * * * *